US012572101B2

(12) United States Patent
Araki

(10) Patent No.: US 12,572,101 B2
(45) Date of Patent: Mar. 10, 2026

(54) IMAGE FORMING APPARATUS INCLUDING A SHEET DETECTION UNIT THAT DETECTS PHYSICAL PROPERTIES OF A SHEET

(71) Applicant: CANON KABUSHIKI KAISHA, Tokyo (JP)

(72) Inventor: Ryuichi Araki, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/751,052

(22) Filed: Jun. 21, 2024

(65) Prior Publication Data

US 2025/0004411 A1 Jan. 2, 2025

(30) Foreign Application Priority Data

Jun. 27, 2023 (JP) ................................ 2023-105354

(51) Int. Cl.
*G03G 15/00* (2006.01)

(52) U.S. Cl.
CPC ..... *G03G 15/5029* (2013.01); *G03G 15/5016* (2013.01); *G03G 15/6552* (2013.01); *G03G 2215/00616* (2013.01); *G03G 2215/00742* (2013.01); *G03G 2215/00751* (2013.01)

(58) Field of Classification Search
CPC ........... G03G 15/5016; G03G 15/5029; G03G 15/6552; G03G 2215/00751; G03G 2215/00616; G03G 2215/00742
See application file for complete search history.

(56) References Cited

U.S. PATENT DOCUMENTS

2016/0139550 A1* 5/2016 Ishida ................ G03G 15/5029 399/45
2022/0283532 A1* 9/2022 Kamiya ............... H04N 1/2353

FOREIGN PATENT DOCUMENTS

| | | | |
|---|---|---|---|
| JP | 2004122766 | A | 4/2004 |
| JP | 2019111753 | A | 7/2019 |
| JP | 2020006627 | A | 1/2020 |
| JP | 2021005951 | A | 1/2021 |

* cited by examiner

*Primary Examiner* — Hoang X Ngo
(74) *Attorney, Agent, or Firm* — Canon U.S.A., Inc. IP Division

(57) ABSTRACT

An image forming apparatus including a conveyance unit, a sheet detection unit, an operation unit, a control unit, and an image forming unit, wherein in a state where the operation unit displays first sheet information based on a detection result of detecting, by the sheet detection unit, physical properties of the sheet conveyed by the conveyance unit and conveyance of the sheet is stopped by the conveyance unit, in a case where the operation unit receives a user instruction to change the first sheet information displayed by the operation unit, the conveyance unit resumes conveyance of the sheet, the control unit sets a second image forming condition corresponding to second sheet information obtained after changing the first sheet information by a user, and the image forming unit forms the image on the sheet based on the second image forming condition.

9 Claims, 17 Drawing Sheets

IMAGE FORMING APPARATUS INCLUDING A SHEET DETECTION UNIT THAT DETECTS PHYSICAL PROPERTIES OF A SHEET

BACKGROUND

Field of the Disclosure

The present disclosure relates to an apparatus for forming an image on a sheet.

Description of the Related Art

Recent electrophotographic image forming apparatuses include a media sensor for determining the type of each sheet. The media sensor detects physical properties of each sheet using an optical sensor or the like. Such image forming apparatuses determine a sheet type based on a detection result from the media sensor using sheet information registered in advance.

Japanese Patent Application Laid-Open No. 2019-111753 discusses an apparatus that detects physical properties of each sheet using a media sensor upon reception of an image forming instruction, and displays an automatic sheet type determination result. The apparatus displays not only the automatic sheet type determination result, but also a button for instructing to start image formation and a cancel button for cancelling an image forming job. If a user determines that the automatic sheet type determination result is correct, the user can execute image formation based on the displayed automatic sheet type determination result by operating the button for instructing to start image formation. On the other hand, if the user determines that the automatic sheet type determination result is incorrect, the user can cancel the image forming job by operating the cancel button.

However, if the automatic sheet type determination result is inappropriate, the user needs to manually configure sheet settings after cancelling the image forming job and then issue an image formation instruction again.

SUMMARY

According to embodiments of the present disclosure, an image forming apparatus includes a conveyance unit configured to convey a sheet, a sheet detection unit configured to detect physical properties of the sheet conveyed by the conveyance unit, an operation unit configured to display sheet information based on a detection result from the sheet detection unit and receive a user instruction, a control unit configured to set an image forming condition corresponding to the sheet information, and an image forming unit configured to form an image on the sheet based on the set image forming condition, the sheet being conveyed by the conveyance unit, wherein in a state where the operation unit displays first sheet information based on a detection result of detecting, by the sheet detection unit, physical properties of the sheet conveyed by the conveyance unit and conveyance of the sheet is stopped by the conveyance unit, in a case where the operation unit receives a user instruction indicating an instruction to form an image based on the first sheet information displayed by the operation unit, the conveyance unit resumes conveyance of the sheet, the control unit sets a first image forming condition corresponding to the displayed first sheet information, and the image forming unit forms the image on the sheet based on the first image forming condition, and in a case where the operation unit receives a user instruction to change the first sheet information displayed by the operation unit, the conveyance unit resumes conveyance of the sheet, the control unit sets a second image forming condition corresponding to second sheet information obtained after changing the first sheet information by a user, and the image forming unit forms the image on the sheet based on the second image forming condition.

Further features of the present disclosure will become apparent from the following description of exemplary embodiments with reference to the attached drawings.

DESCRIPTION OF THE EMBODIMENTS

An image forming apparatus according to an exemplary embodiment of the present disclosure will be described with reference to FIG. 1. The term "grammage" as used herein refers to the weight per unit area of paper and is expressed as [g/m$^2$].

(Image Forming Apparatus)

Figure 1:
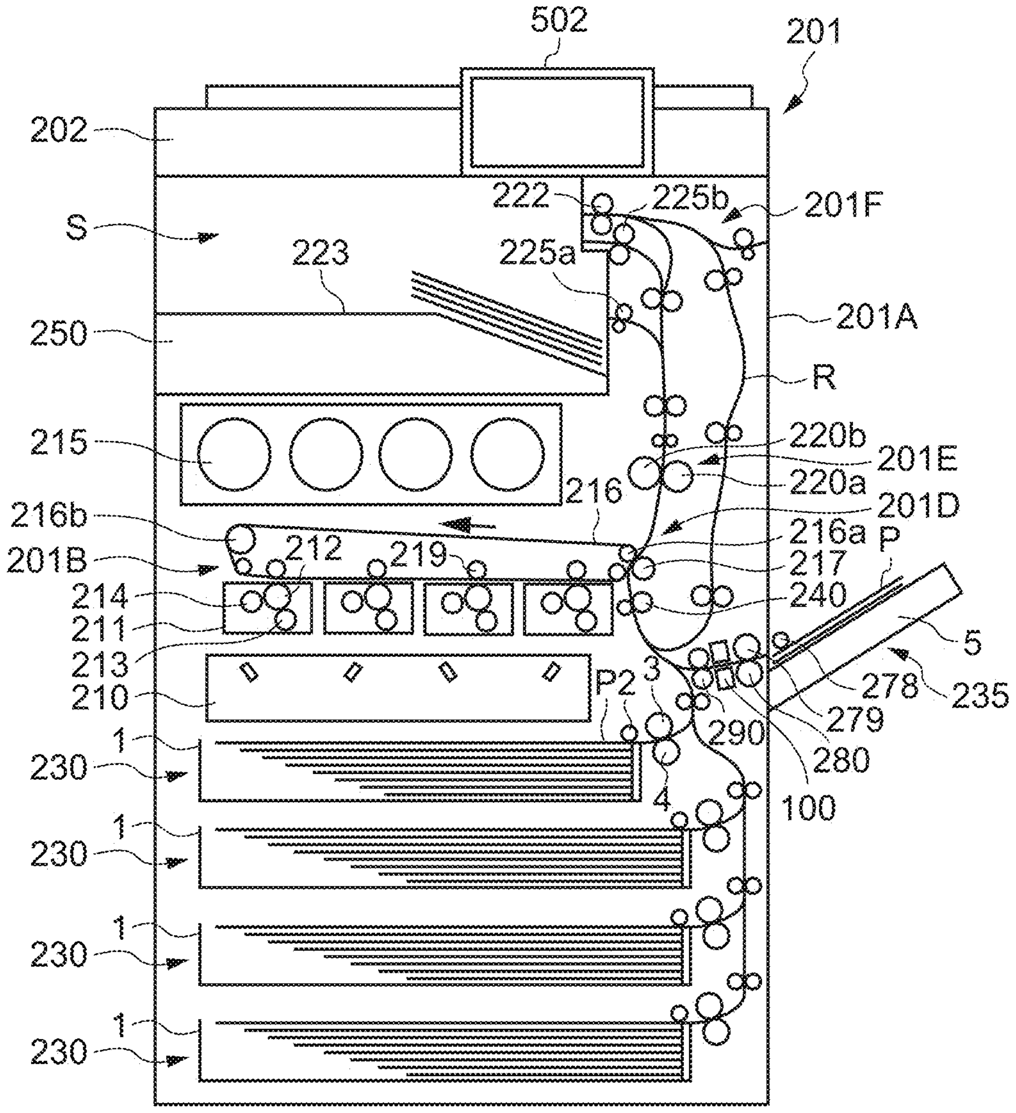
FIG. 1 is a sectional view of an image forming apparatus according to an exemplary embodiment of the present disclosure.

FIG. 1 is a sectional view illustrating a schematic structure of an image forming apparatus 201.

Figure 2:
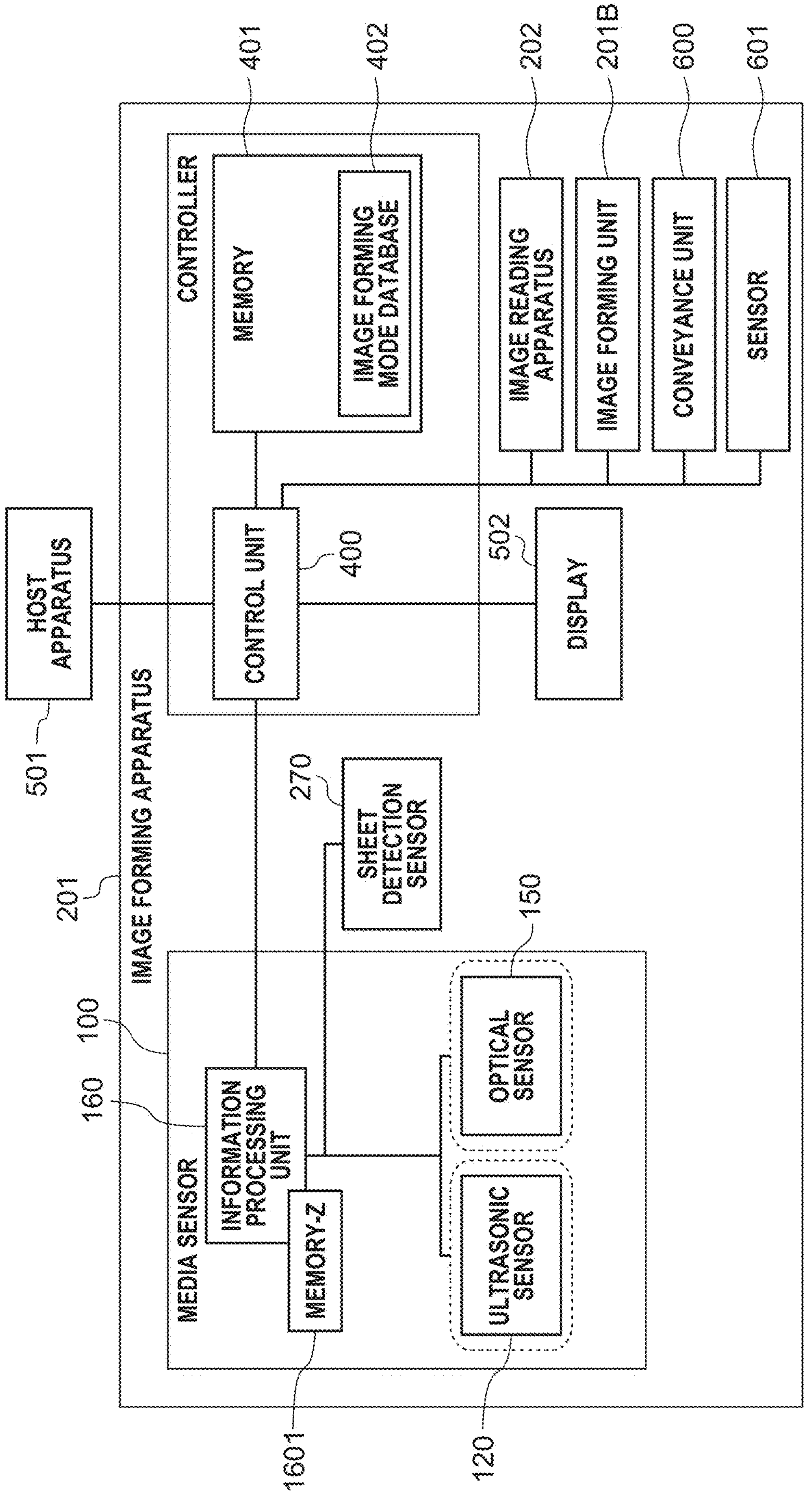
FIG. 2 illustrates a control block diagram.

The image forming apparatus 201 is a laser beam printer of a tandem intermediate-transfer type using an electrophotographic process. The image forming apparatus 201 receives image data output from a host apparatus 501 (FIG. 2). The image forming apparatus 201 is configured to form an image on a sheet P, which is a print medium, based on the input image data.

FIG. 2 illustrates a control block diagram. A control unit 400 is a control unit that controls an overall operation of the image forming apparatus 201 in an integrated manner, and exchanges information with the host apparatus 501 and a display 502. A memory 401 stores control programs, default values for various setting values, and the like according to the present exemplary embodiment. The memory 401 also stores an image forming mode database 402. The control unit 400 is connected to each of a media sensor 100 and an image forming unit 201B. The control unit 400 is also connected to each of a conveyance unit 600 for conveying sheets, the media sensor 100, and a sheet detection sensor 270. The control unit 400 is also connected to a sensor 601 other than the media sensor 100 and the sheet detection sensor 270. The media sensor 100 includes an information processing unit 160, an ultrasonic sensor (sheet detection unit) 120, and an optical sensor (sheet detection unit) 150. The information processing unit 160 is connected to each of the ultrasonic sensor 120, the optical sensor 150, and the sheet detection sensor 270. The information processing unit 160 includes a memory-Z 1601. The media sensor 100 will be described in detail below.

The display (operation unit) 502 is, for example, a touch panel, and displays various information and receives a user instruction by a touch panel function. The control unit 400 controls an image forming operation by executing control programs stored in the memory 401.

In a configuration example illustrated in FIG. 1, an image reading apparatus 202 is located on an image forming apparatus main body 201A. A discharge space S for discharging sheets is formed between the image reading apparatus 202 and the image forming apparatus main body 201A. The image reading apparatus 202 is connected to the control unit 400. In the present exemplary embodiment, the image reading apparatus 202 is configured as a part of the image forming apparatus 201. However, the configuration of the image reading apparatus 202 is not limited to this example. The image reading apparatus 202 may be configured as an apparatus different from the image forming apparatus 201.

A cassette feeding unit 230 includes a feeding cassette 1 that contains sheets P. The cassette feeding unit 230 also includes a pickup roller 2 for picking up each sheet P contained in the feeding cassette 1. The cassette feeding unit 230 also includes a feed roller 3 and a retard roller 4 for separating the sheet P delivered from the pickup roller 2. A manual feeding unit 235 includes a manual feed tray 5 as a unit to hold the sheet P. The manual feeding unit 235 includes a pickup roller 278 for picking up the sheet P placed on the manual feed tray 5. The manual feeding unit 235 also includes a feed roller 279 and a retard roller 280 for separating the sheet P delivered from the pickup roller 278.

The media sensor 100 is located on a conveyance path between the feed roller 279 and a drawing roller 290. The media sensor 100 detects physical properties of the sheet P that has been picked up by the pickup roller 278 and has been conveyed by the feed roller 279. The media sensor 100 according to the present exemplary embodiment is located at a position illustrated in FIG. 1. However, the position of the media sensor 100 is not limited to this example.

For example, the media sensor 100 may be provided on a conveyance path between a registration roller pair 240 and the feed roller 3, and the media sensor 100 may detect the sheet P fed from the cassette feeding unit 230.

The image forming unit 201B includes a laser scanner 210 and four image forming units 211 that form toner images of four colors, i.e., yellow (Y), magenta (M), cyan (C), and black (K), respectively. Each image forming unit 211 includes a photosensitive drum 212, a charging device 213, and a developing device 214. The image forming unit 201B also includes a secondary transfer unit 201D, which is located above the image forming unit 211, and a fixing unit 201E. A toner cartridge 215 supplies toner to the developing device 214.

The secondary transfer unit 201D includes a drive roller 216*a*, a tension roller 216*b*, and a transfer belt 216 that is wound around the drive roller 216*a* and the tension roller 216*b*. The secondary transfer unit 201D also includes a primary transfer roller 219 that contacts the transfer belt 216 at a position opposed to the photosensitive drum 212 on the inside of the transfer belt 216. The transfer belt 216 is rotated in an arrow direction by the drive roller 216*a*. The secondary transfer unit 201D also includes a secondary transfer roller 217. The secondary transfer roller 217 is provided at a position opposed to the drive roller 216*a*.

The fixing unit 201E is located downstream in a conveyance direction of the secondary transfer roller 217. The fixing unit 201E includes a pressure roller 220*a* and a heating roller 220*b*.

A first discharge roller pair 225*a* and a second discharge roller pair 225*b* are located downstream in the conveyance direction of the fixing unit 201E. A duplex reverse unit 201F is located downstream of the first discharge roller pair 225*a* and the second discharge roller pair 225*b*. The duplex reverse unit 201F includes a reverse roller pair 222 for reversing the sheet P on one side of which an image has been formed, and a reconveyance path R as a conveyance path for conveying the reversed sheet P to the image forming unit 201B again.

The conveyance unit 600 includes the pickup roller 278, the feed roller 279, the retard roller 280, the drawing roller 290, the pickup roller 2, the feed roller 3, the retard roller 4, and motors for driving these rollers. The conveyance unit 600 also includes the registration roller pair 240 and a motor for driving the registration roller pair 240. The conveyance unit 600 also includes a motor for driving the secondary transfer roller 217, a motor for driving the pressure roller 220*a*, and a motor for driving the heating roller 220*b*. The conveyance unit 600 also includes the first discharge roller pair 225*a*, the second discharge roller pair 225*b*, the reverse roller pair 222, other rollers for conveying sheets within the image forming apparatus 201, and motors for driving these rollers.

The display 502 that receives an operation from the user is located above the image forming apparatus 201. The display 502 is configured as a part of the image forming apparatus 201. However, the configuration of the display 502 is not limited to this example. For example, the display 502 may be configured as an apparatus different from the image forming apparatus 201, and may be electrically connected to the control unit 400 of the image forming apparatus 201.

(Image Forming Job of Image Forming Apparatus)

Next, an image forming operation to be performed by the image forming apparatus 201 will be described. Upon receiving an image forming operation start instruction from the host apparatus 501, which is an external apparatus, the control unit 400 starts an image forming job. The user may input the image forming operation start instruction to the control unit 400 by operating the display 502. The term "image forming job" refers to a series of operations from reception of the image forming operation start instruction, execution of an image forming operation thereafter, to discharge of a sheet onto a stacking unit 223. After receiving the image forming operation start instruction, the control unit 400 performs image processing on received image data. The control unit 400 drives the laser scanner 210 based on the image data. The laser scanner 210 sequentially exposes the surface of the photosensitive drum 212, which is uniformly charged with a predetermined polarity and potential by the charging device 213, with a laser, thereby forming electrostatic latent images. Thus, electrostatic latent images of yellow, magenta, cyan, and black are sequentially formed on the surface of each photosensitive drum 212.

Figure 3A:
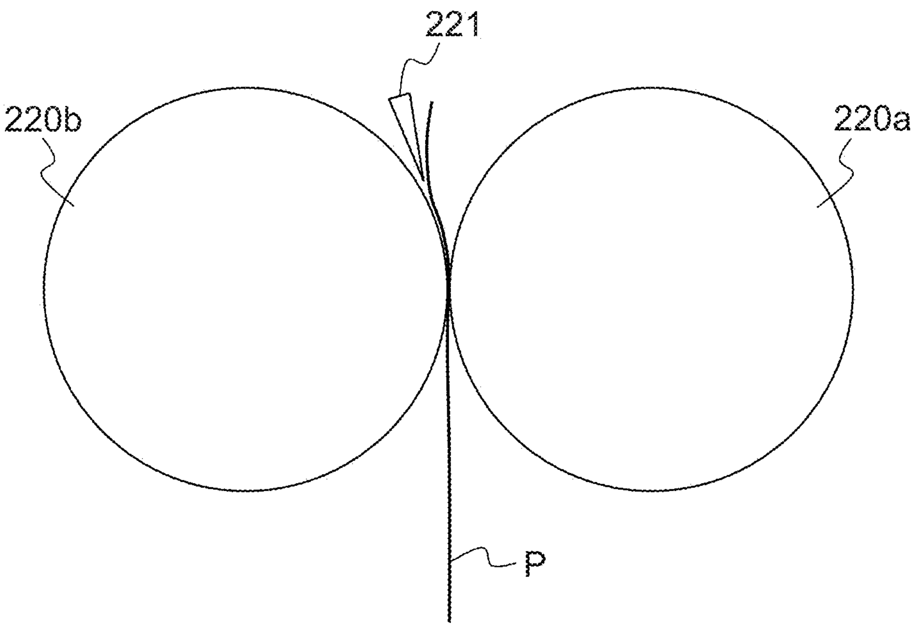
FIGS. 3A and 3B each illustrate a state where a sheet is separated in a fixing unit.
Figure 3B:
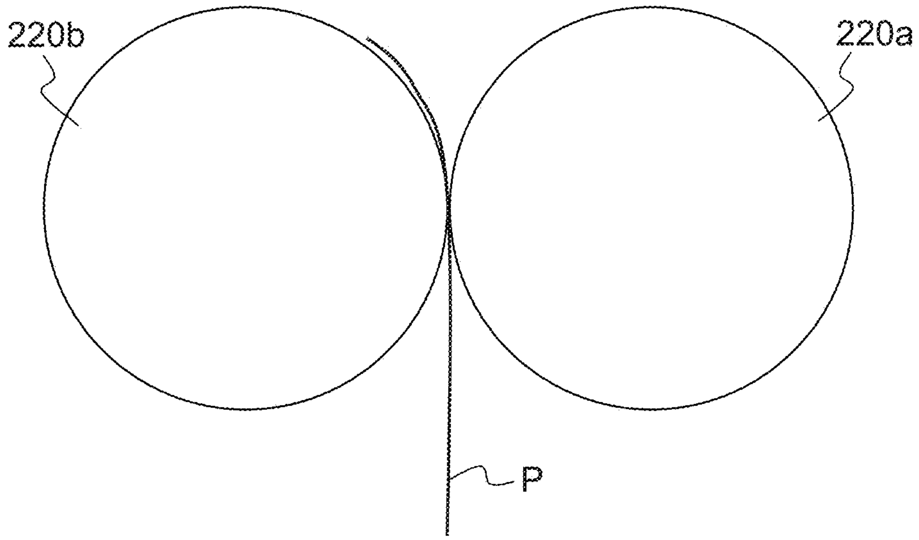

The developing device 214 develops the electrostatic latent images with each color toner, thereby forming toner images. The toner images of the respective colors are sequentially superimposed and transferred on the transfer belt 216 by primary transfer bias applied to the primary transfer roller 219. Thus, the toner images are formed on the transfer belt 216. In parallel with formation of the toner images, the sheet P is fed from the cassette feeding unit 230 and is conveyed to the registration roller pair 240. A skew of the sheet P is corrected by the registration roller pair 240. The registration roller pair 240 conveys the sheet P to the secondary transfer unit 201D. The secondary transfer unit 201D transfers the toner images on the transfer belt 216 onto the sheet P by secondary transfer bias applied to the secondary transfer roller 217. The sheet P onto which the toner images are transferred is conveyed to the fixing unit 201E. The fixing unit 201E applies heat and pressure to the toner images on the sheet P at a roller nip portion formed by the pressure roller 220*a* and the heating roller 220*b*, thereby fixing the toner images onto the sheet P. In this case, due to the adhesive force of melted toner, a force to stick to the heating roller 220*b* is generated on the sheet P. If the stiffness of the sheet P is low, the sheet P can be wound up by the rotating heating roller 220*b*. For this reason, a separation plate 221 for separating the sheet P from the heating roller 220*b* is provided on the downstream side of the heating roller 220*b* (FIG. 3A). If the separation plate 221 is not provided, the sheet P can be wound up by the rotating heating roller 220*b* as illustrated in FIG. 3B.

The first discharge roller pair 225*a* or the second discharge roller pair 225*b* located downstream of the fixing unit 201E discharges the sheet P onto which the images are fixed to the discharge space S. Thus, the sheet P is stacked on the stacking unit 223 provided on a bottom surface of the discharge space S. In the case of forming images on both sides of the sheet P, the sheet P on one side of which an image has been formed is conveyed to the reconveyance path R by the reverse roller pair 222. Then, the sheet P is conveyed to the image forming unit 201B again and an image is formed on the other side of the sheet P. After that, the sheet P is discharged to the discharge space S by the first discharge roller pair 225*a* or the second discharge roller pair 225*b*. Thus, the image forming job for the image forming apparatus 201 is completed. This image forming operation is executed based on a set image forming mode.

Figure 16:
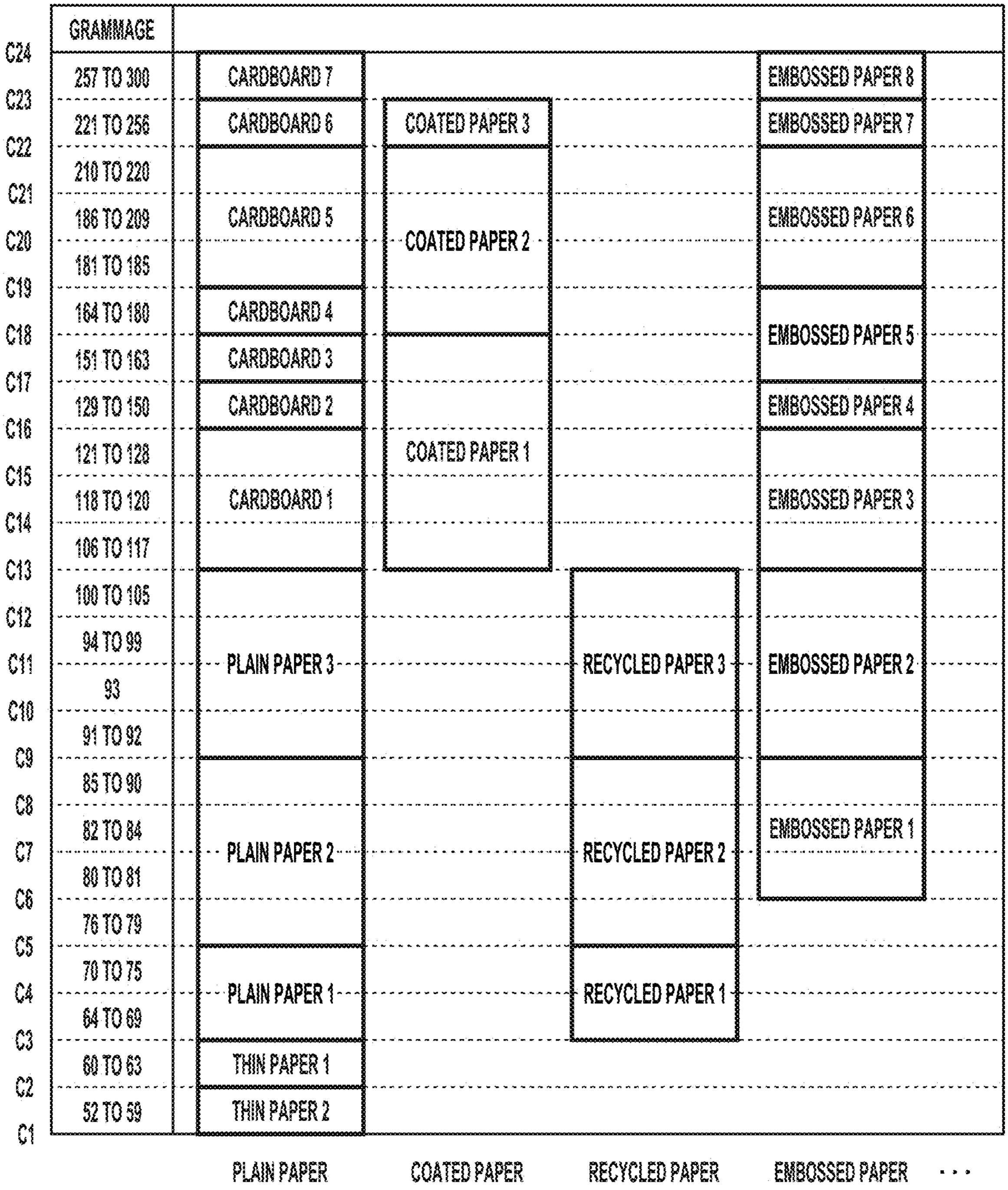
FIG. 16 illustrates an image forming mode corresponding to a grammage range and a sheet type.

The term "image forming mode" refers to a predetermined image forming condition (e.g., a transfer voltage value of the secondary transfer unit 201D, a target temperature of the fixing unit 201E, and a conveyance speed of the fixing unit 201E). Each image forming mode has a name, such as "thin paper 1", "thin paper 2", "plain paper 1", "coated paper 1", "coated paper 2", or "coated paper 3", as illustrated in FIG. 16 to be described below. In the present exemplary embodiment, the name, such as "thin paper 1", "thin paper 2", "plain paper 1", "coated paper 1", "coated paper 2", or "coated paper 3", as illustrated in FIG. 16 is included in information corresponding to the name of each image forming mode.

An appropriate image forming mode varies depending on physical properties (grammage, surface property) of each sheet on which an image is formed. The surface property of each sheet varies depending on the type of each sheet. Accordingly, the surface property of each sheet has a correlation with a sheet type. Therefore, to appropriately set the image forming mode, it is important to recognize the grammage and sheet type of each sheet to be used before the image forming operation is performed. In the present exemplary embodiment, the grammage and sheet type of each sheet are determined based on a detection result from the media sensor 100.

(Configuration of Media Sensor)

As illustrated in FIG. 2, the media sensor 100 includes the ultrasonic sensor 120, the optical sensor 150, and the information processing unit 160. The information processing unit 160 transmits a detection instruction to the ultrasonic sensor 120 and the optical sensor 150, and performs processing on the detection result from the ultrasonic sensor 120 and the optical sensor 150. The sheet detection sensor 270 is a sensor for detecting the presence or absence of a sheet. The optical sensor 150 that is electrically connected to the media sensor 100 is a contact image sensor (CIS).

Figure 4:
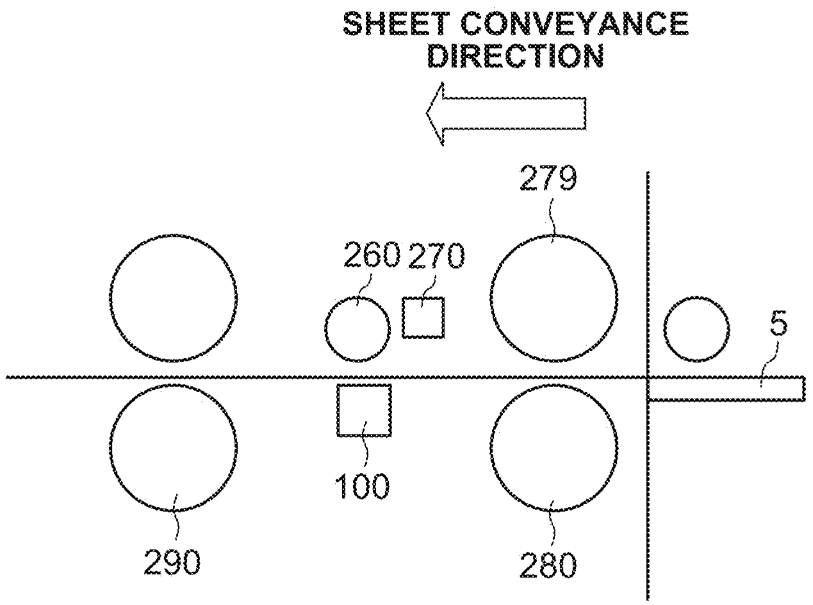
FIG. 4 illustrates a media sensor as viewed along a direction orthogonal to a sheet conveyance direction.
Figure 5:
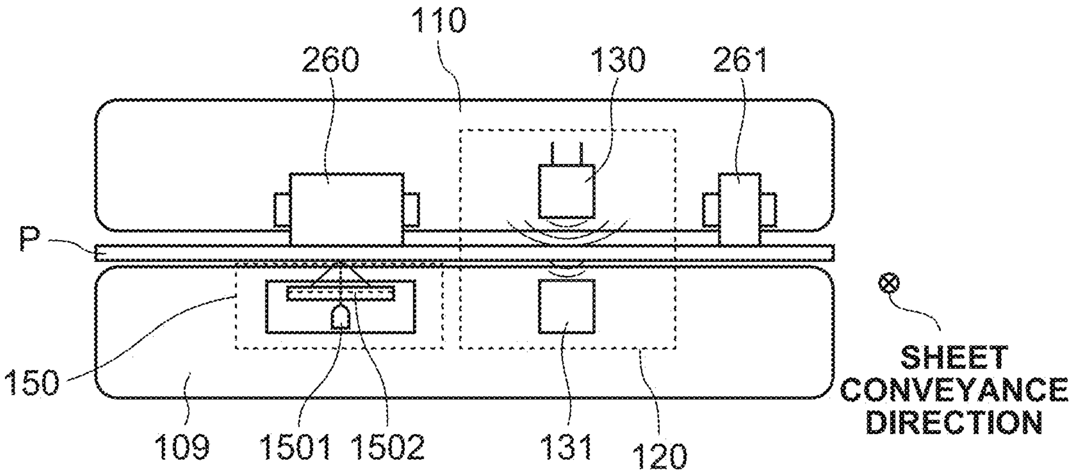
FIG. 5 illustrates the media sensor as viewed along the sheet conveyance direction.

A configuration example of the media sensor 100 will be described with reference to FIGS. 4 and 5. FIG. 4 illustrates the media sensor 100 as viewed along a direction orthogonal to the sheet conveyance direction. FIG. 5 illustrates the media sensor 100 as viewed along the sheet conveyance direction. As illustrated in FIG. 4, the media sensor 100 is located on the conveyance path between the feed roller 279 and the drawing roller 290. The sheet detection sensor 270 is located upstream of the media sensor 100 and downstream of the feed roller 279 in the sheet conveyance direction. As illustrated in FIG. 5, the media sensor 100 includes the ultrasonic sensor 120 and the optical sensor 150. The ultrasonic sensor 120 includes an ultrasonic transmitter 130 and an ultrasonic receiver 131. The optical sensor 150 includes a light source 1501 (light-emitting diode (LED)) and a line sensor 1502. During detection of a sheet by the optical sensor 150 and during detection of a sheet by ultrasonic waves, it may be desirable to stabilize the orientation of the sheet P by reducing flapping of the conveyed sheet P. To stabilize the orientation of the sheet P by reducing flapping of the sheet P, a sheet pressing roller 260 and a sheet pressing roller 261 are provided between the feed roller 279 and the drawing roller 290. The sheet pressing roller 260 is located at a position opposed to the optical sensor 150 and is configured to press the sheet P against the optical sensor 150. This configuration makes it possible to reduce flapping of the sheet P and stabilize the orientation of the sheet P when the optical sensor 150 measures the surface of the sheet P located in a detectable region where the optical sensor 150 can detect the sheet P. The sheet pressing roller 261 is configured to press the sheet P against a lower block 109. The detectable region where the ultrasonic sensor 120 can detect the sheet P is located between the sheet pressing roller 260 and the sheet pressing roller 261 in a sheet width direction orthogonal to the sheet conveyance direction. This configuration makes it possible to reduce flapping of the sheet P and stabilize the orientation of the sheet P when the ultrasonic sensor 120 measures the surface of the sheet P. In a configuration example illustrated in FIG. 4, the ultrasonic transmitter 130 is located such that the ultrasonic transmitter 130 is hidden behind the sheet pressing roller 260, and thus is not illustrated in FIG. 4. In the configuration example illustrated in FIG. 4, the sheet pressing roller 261 is located such that the sheet pressing roller 261 is hidden behind the sheet pressing roller 260, and thus is not illustrated in FIG. 4.

(Obtainment of Grammage)

The grammage of sheets is obtained based on a detection result from the ultrasonic sensor 120.

As illustrated in FIG. 5, the ultrasonic transmitter 130 is located in an upper block 110 and the ultrasonic receiver 131 is located in the lower block 109 in such a manner that the ultrasonic transmitter 130 and the ultrasonic receiver 131 sandwich the conveyance path for conveying the sheet P.

The ultrasonic transmitter 130 and the ultrasonic receiver 131 are each formed of a piezoelectric element (also referred to as a "piezo element"), which is an element for mutual conversion between a mechanical displacement and an electric signal, and an electrode terminal. When a pulse voltage having a predetermined frequency is input to the electrode terminal of the ultrasonic transmitter 130, the piezoelectric element of the ultrasonic transmitter 130 generates ultrasonic waves by oscillation of the piezoelectric element of the ultrasonic transmitter 130. The generated ultrasonic waves propagate to the ultrasonic receiver 131 via the sheet P. The piezoelectric element of the ultrasonic receiver 131 receives ultrasonic waves propagating via the sheet P, and causes the electrode terminal of the ultrasonic receiver 131 to generate an output voltage corresponding to the amplitude of the received ultrasonic waves. A ratio between the output voltage when no sheet is present between the ultrasonic transmitter 130 and the ultrasonic receiver 131 and the output voltage when a sheet is present between the ultrasonic transmitter 130 and the ultrasonic receiver 131 corresponds to a transmittance (transmittance coefficient). The ultrasonic waves transmitted from the ultrasonic transmitter 130 attenuate while passing through the sheet P, and the attenuated ultrasonic waves are received by the ultrasonic receiver 131. The degree of attenuation of ultrasonic waves varies depending on the difference in the grammage of sheets, so that the transmittance also varies depending on the difference in the grammage of sheets. Use of the transmittance and an ultrasonic wave transmittance coefficient-sheet grammage conversion equation makes it possible to estimate the grammage of sheets.

In the present exemplary embodiment, the grammage is determined based on a detection result from the ultrasonic sensor 120. However, the present exemplary embodiment is not limited to this example. For example, the sheet P may be sandwiched between a first roller that is fixed in a sheet thickness direction and a second roller that is movable depending on the thickness of the sheet P, and the grammage may be determined based on the movement amount of the second roller.

(Obtainment of Surface Property)

The surface property of the sheet P is obtained based on a detection result from the optical sensor 150.

As described above with regard to the configuration of the media sensor 100, the optical sensor 150 includes the light source 1501 and the line sensor 1502.

Figure 6A:
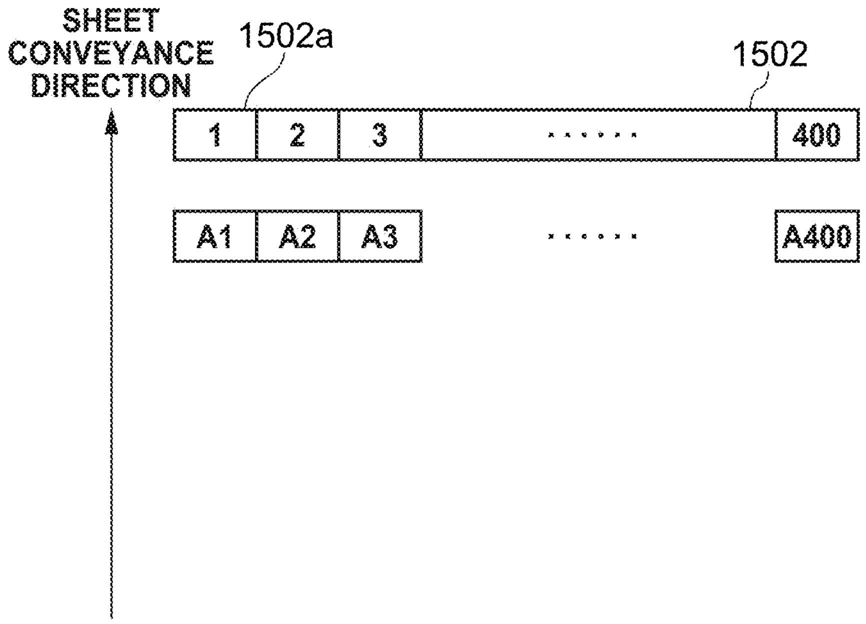
FIGS. 6A and 6B each illustrate a line sensor reading image.

Light emitted from the light source (LED) 1501 is refracted by a line guide (not illustrated) and is applied to the sheet P from a certain angle. After that, the reflected light from the sheet P is received by the line sensor 1502 via a lens (not illustrated). This configuration enables the line sensor 1502 to read the reflected light from the sheet P as an image. FIG. 6A is a reading image diagram of the line sensor 1502. As illustrated in FIG. 6A, image sensors 1502*a* of the line sensor 1502 are arrayed at a pitch of 300 dpi in the direction orthogonal to the sheet conveyance direction. The image sensors 1502*a* of the line sensor 1502 are configured to capture images (A1, A2, A3, . . . , and A400) corresponding to 400 pixels in the direction orthogonal to the sheet conveyance direction in one image capturing operation.

The CIS can detect only images corresponding to one line in one scanning. A detection result corresponding to one line is not sufficient as the amount of information used to determine the surface property of each sheet. This is because if the surface property of each sheet is determined based only on the images corresponding to one line within a certain sheet surface, variations in the output result for each detection position increase. To address this issue, the line sensor 1502 captures images corresponding to a plurality of lines on the conveyed sheet P.

Figure 6B:
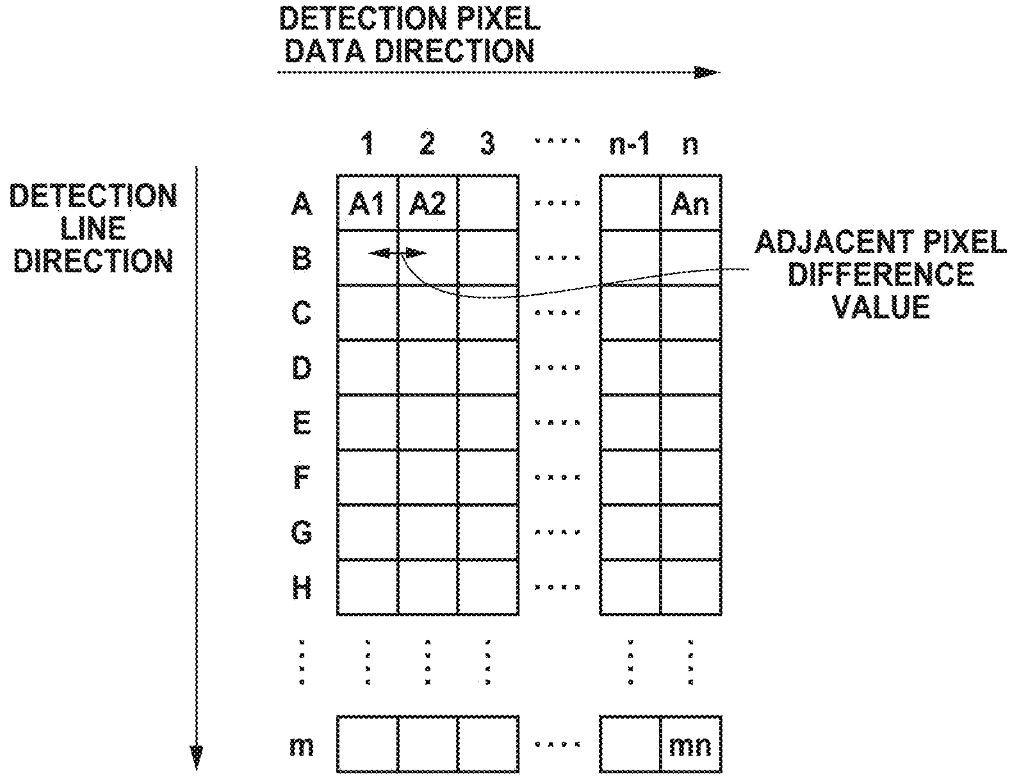

An adjacent pixel difference accumulation value is a value obtained by adding the result of accumulating luminance differences between adjacent pixels of the line sensor 1502 a number of times corresponding to the number of lines. The adjacent pixel difference accumulation value is an index representing the unevenness of each sheet. As illustrated in FIG. 6B, pixels are denoted by numbers "1" to "n", respectively, detection lines are denoted by reference symbols "A" to "n", respectively, in order of detection lines, and a detection value for each pixel is denoted by a detection line name+pixel number. In this case, an adjacent pixel difference accumulation value Y is represented by the following expression (1) using an adjacent pixel difference accumulation value k for each line. A detection pixel data direction illustrated in FIG. 6B corresponds to an array direction of the image sensors 1502*a* of the line sensor 1502. A detection line direction illustrated in FIG. 6B corresponds to the sheet conveyance direction.

$$
\begin{gathered}
kA = (A2 - A1) + (A3 - A2) \ldots + (An - An - 1) \\
kB = (B2 - B1) + (B3 - B2) \ldots + (Bn - Bn - 1) \\
\vdots \\
km = (m2 - m1) + (m3 - m2) \ldots + (mn - mn - 1 \\
Y = kA + kB + \ldots km
\end{gathered} \tag{1}
$$

A total luminance value is a value obtained by adding the total value of pixel luminance values of light received by the line sensor 1502 a number of times corresponding to the number of detection lines, and represents the brightness of each sheet. A total luminance value M is represented by the following expression (2).

$$M = A1 + A2 + \ldots B1 + B2 + \ldots G1 + G2 + \ldots + mn \tag{2}$$

A transparent film that has high transparency and is made of resin, such as polyethylene terephthalate (PET), reflects less light from the light source 1501, and the total luminance value of the transparent film to be measured is low. A sheet, such as embossed paper, which is obtained by intentionally giving a geometric uneven shape to the surface of the sheet, has a large luminance difference between adjacent pixels due to the unevenness, which leads to an increase in the adjacent pixel difference accumulation value. Recycled paper also has unevenness in a grain direction. The surface roughness of recycled paper increases as pulp fiber decreases in length after several recycling processes. Accordingly, the adjacent pixel difference accumulation value of recycled paper tends to increase. On the contrary, coated paper is less uneven due to a coated layer formed on the surface thereof, and thus the adjacent pixel difference accumulation value of coated paper tends to decrease.

In the present exemplary embodiment, the surface property of each sheet is determined using the adjacent pixel difference accumulation value. However, the present exemplary embodiment is not limited to this example. For example, the surface property may be determined based on detection results from a first light-receiving unit and a second light-receiving unit. The first light-receiving unit detects diffuse-reflected light from the sheet P by irradiating the surface of the sheet P with light at a predetermined incident angle by an irradiation unit. The second light-receiving unit detects regular reflection from the sheet P. In general, a sheet with low glossiness has perfect diffusion characteristics as reflection characteristics, and a sheet with high glossiness has regular reflection and diffusion characteristics as reflection characteristics. The use of a difference in reflection characteristics depending on the surface property of each sheet makes it possible to detect the surface property of each sheet.

In the present exemplary embodiment, the transparency is determined using reflected light from the sheet P. However, the present exemplary embodiment is not limited to this example. For example, the irradiation unit may irradiate the surface of the sheet P with light and the transparency may be determined based on a detection result from a light-receiving unit for detecting light that has passed through the sheet P.

(Processing in Information Processing Unit)

The information processing unit 160 transmits a detection instruction to the ultrasonic sensor 120 and the optical sensor 150, and performs processing on the detection result from the ultrasonic sensor 120 and the optical sensor 150.

Upon receiving a sheet detection instruction from the control unit 400, the information processing unit 160 starts a detection sequence. First, the information processing unit 160 performs initialization processing on the ultrasonic sensor 120 and the optical sensor 150 to prepare for the sheet detection sequence. In the initialization processing, the information processing unit 160 calls initial setting values stored in the memory-Z 1601 and sets the initial setting values. After that, the information processing unit 160 causes the ultrasonic sensor 120 to execute ultrasonic wave detection in a state where no sheet is present in the detectable range where a sheet can be detected. Further, the information processing unit 160 stores a result of an output voltage A, which is generated by the ultrasonic sensor 120 in the state where no sheet is present in the detectable range, in the memory-Z 1601. Then, upon detection of the conveyed sheet P by the sheet detection sensor 270, the information processing unit 160 causes the ultrasonic sensor 120 to execute ultrasonic wave detection on the sheet P that has entered the detectable range of the ultrasonic sensor 120. The information processing unit 160 stores a result of an output voltage B, which is generated by the ultrasonic sensor 120, in the memory-Z 1601, and calculates the transmittance based on the output voltage A and the output voltage B.

Upon detection of the conveyed sheet P by the sheet detection sensor 270, the information processing unit 160 causes the optical sensor 150 to execute luminance value detection on the sheet P that has entered the detectable range of the optical sensor 150. Further, the information processing unit 160 stores an output value (luminance value) for each pixel from the optical sensor 150 in the memory-Z 1601. After that, the information processing unit 160 processes the output value from the optical sensor 150, and stores the total luminance value and the adjacent pixel difference accumulation value in the memory-Z 1601 within the information processing unit 160.

Figure 7:
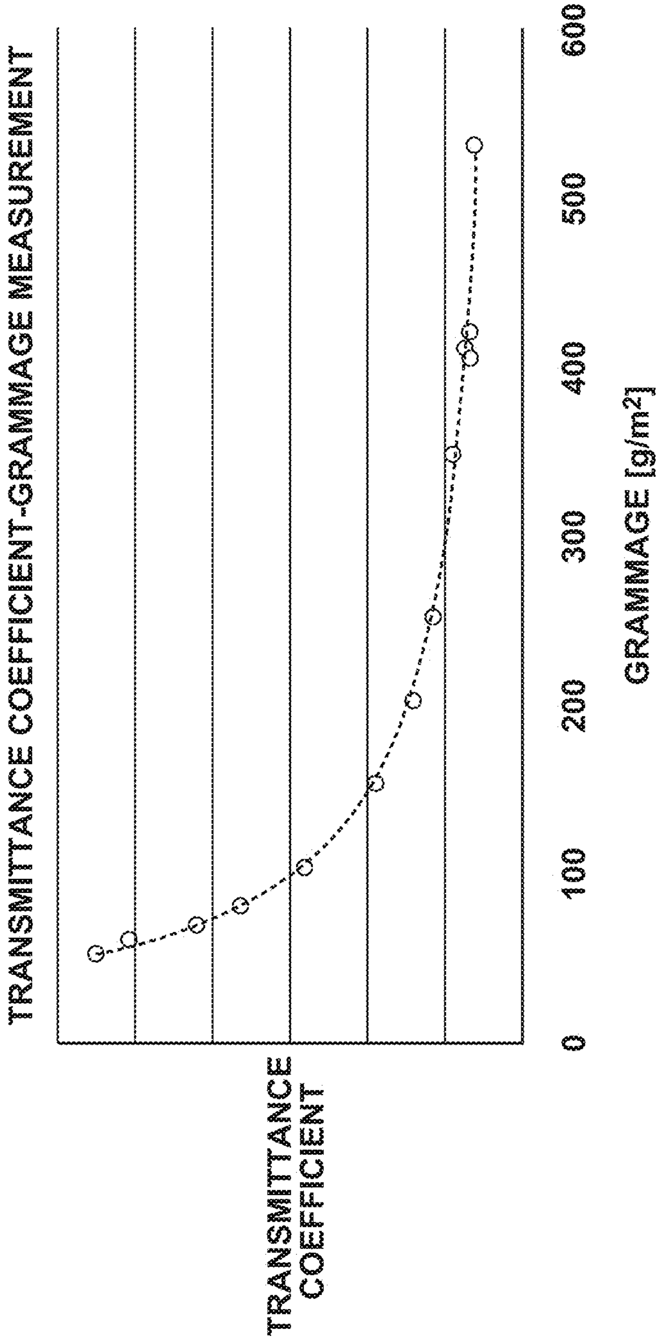
FIG. 7 is a graph illustrating a relationship between a transmittance coefficient and grammage.

The information processing unit 160 converts the detection result from the ultrasonic sensor 120 into grammage, and stores the grammage in the memory-Z 1601 within the information processing unit 160. To convert the transmittance of an ultrasonic wave into grammage, the transmittance (transmittance coefficient) is calculated based on the detection result obtained when no sheet is present and the detection result obtained when a sheet is present, and the grammage is calculated using the ultrasonic wave transmittance coefficient-sheet grammage conversion equation corresponding to FIG. 7.

After the grammage is calculated, the information processing unit 160 determines that all measurements are completed, and transmits the grammage, the adjacent pixel difference accumulation value, and the total luminance value to the control unit 400. As described below, the control unit 400 determines the type of each sheet based on the adjacent pixel difference accumulation value, the total luminance value, and a table corresponding to a matrix illustrated in FIG. 15.

(Variations in Individual Differences Among Sheets)

Figure 8:
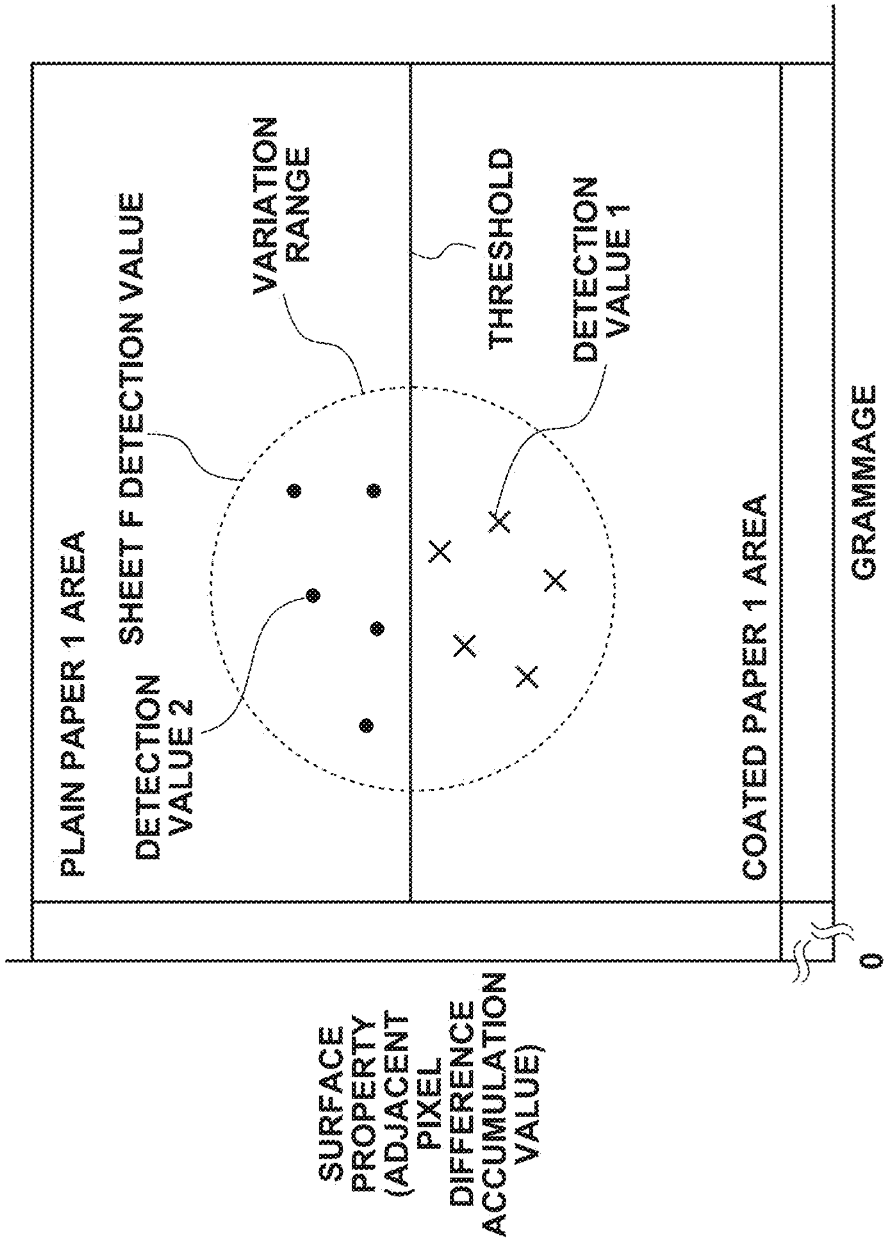
FIG. 8 is a conceptual diagram illustrating variations in individual differences among sheets.

FIG. 8 illustrates experimental results of detecting a plurality of sheets F using the media sensor 100.

Each sheet F is coated paper. FIG. 8 illustrates an example of variations in detection values of the grammage and the adjacent pixel difference accumulation value due to various factors. The detection values obtained as a result of sheet detection can vary across a boundary (threshold) for determination, and the ratio at which variations in the detection result occur due to individual differences among sheets is large. If a detection value 1 (represented by "x" in FIG. 8) for the same sheet F is obtained, "coated paper 1" is set in the determination of the image forming mode to be described below. If a detection value 2 (represented by a black circle in FIG. 8) is obtained, "plain paper 1" is set in the determination of the image forming mode to be described below. In the determination of the image forming mode as described below, the image forming mode is determined based on the adjacent pixel difference accumulation value, the total luminance value, the grammage, the table corresponding to the matrix illustrated in FIG. 15, and the table corresponding to information illustrated in FIG. 16.

To perform a high-quality image forming operation, it may be desirable to form an image under image forming conditions appropriate for each sheet. For example, if a sheet corresponding to plain paper is erroneously determined to be coated paper, the transfer voltage of the secondary transfer unit 201D that is appropriate for coated paper and the target temperature of the fixing unit 201E that is appropriate for coated paper are set. In this setting, the hue of the formed image is inappropriate. Additionally, the amount of heating with respect to the heat capacity of the sheet is extremely large, so that the sheet can be discharged in a curled state, for example, and a printed matter that is undesirable for the user can be obtained.

Figure 15:
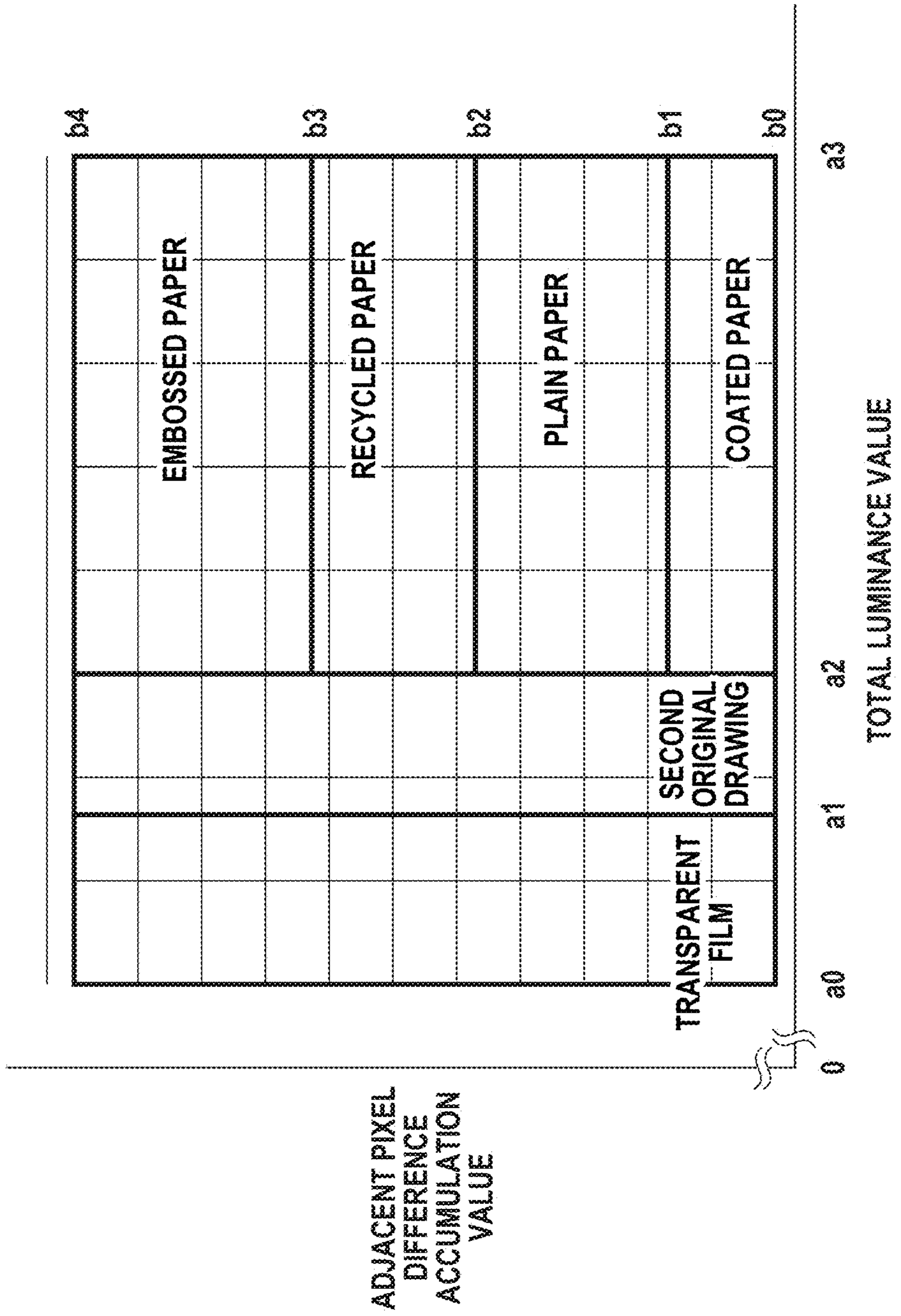
FIG. 15 illustrates a surface property classification matrix.

The adjacent pixel difference accumulation value and a threshold for the total luminance value illustrated in FIG. 15 and a threshold for the grammage illustrated in FIG. 16 are set so that the control unit 400 can determine each sheet type based on the detection result from the media sensor 100. However, it may be difficult to cope with variations in individual differences among all sheets corresponding to several hundred types of sheets. Although the image forming mode can be appropriately set in many cases, the image forming mode cannot be appropriately set in some cases due to variations in individual differences among sheets such as the sheet F.

For this reason, in the present exemplary embodiment, the display 502 displays the determination result (sheet type and grammage range) of the sheet whose physical properties are detected by the media sensor 100 in the image forming job. If the user determines that the displayed sheet type and grammage range are different from the actual sheet type and grammage range, the user can change the sheet type and the grammage range to another sheet type and another grammage range. Further, in the image forming mode corresponding to the changed sheet type and the changed grammage range, the image forming unit 201B executes the image forming operation on this sheet. Consequently, degradation of the quality of a product obtained by performing the image forming operation can be prevented.

(Settings for Image Forming Mode and Image Forming Operation)

Figure 9:
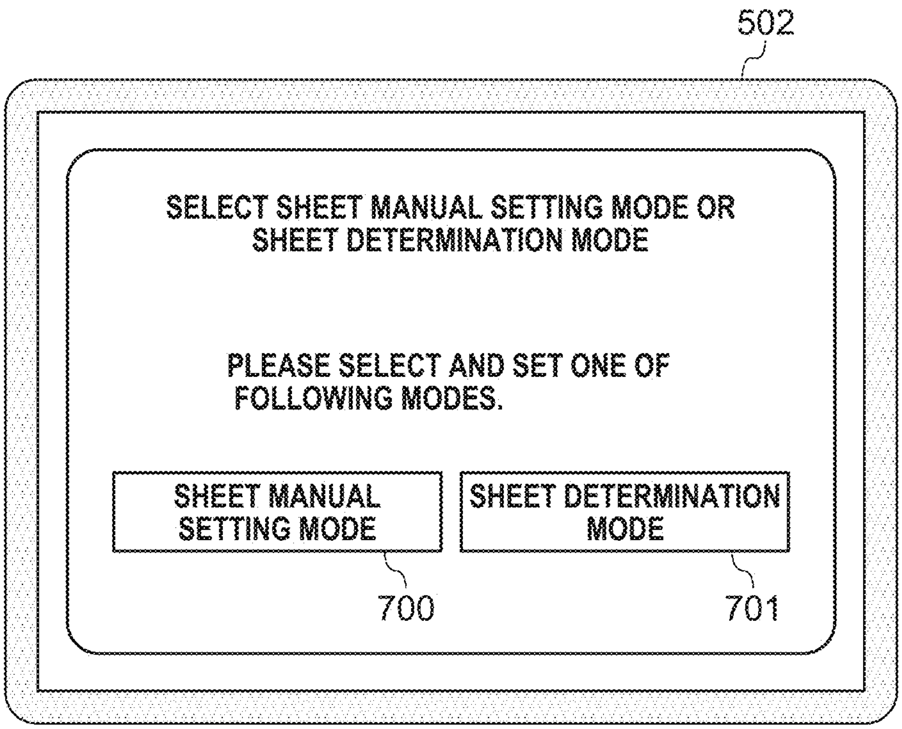
FIG. 9 illustrates a display example of a display ("manual setting/determination" mode selection).

FIG. 9 illustrates a state where a sheet manual setting mode key 700 to be used for the user to select and set one of a plurality of image forming modes stored in the image forming mode database 402 is displayed on the display 502. The sheet manual setting mode key 700 is a key to be used for the user to select the sheet manual setting mode. FIG. 9 illustrates a state where a sheet determination mode key 701 for sheet determination based on the media sensor 100 is displayed on the display 502. The sheet determination mode key 701 is a key to be used for the user to select the sheet determination mode. The user can select one of the sheet manual setting mode and the sheet determination mode from the state illustrated in FIG. 9. The sheet manual setting mode is a mode in which the user manually selects the sheet type and the grammage range.

The user can call a setting screen illustrated in FIG. 9 by operating the display 502.

Figure 10:
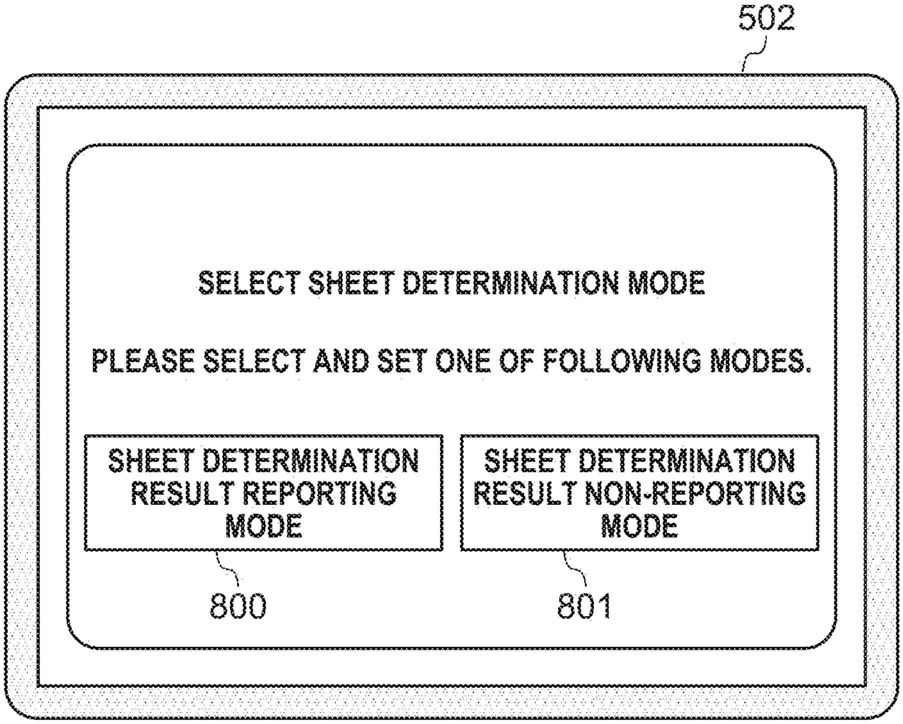
FIG. 10 illustrates a display example of the display ("reporting/non-reporting" mode selection).

FIG. 10 illustrates a display state of the display 502 when the user performs a touch operation on the sheet determination mode key 701 (FIG. 9) for sheet determination based on the media sensor 100.

FIG. 10 illustrates a state where a setting key A 800 is displayed on the display 502. The setting key A 800 is a key to be used for the user to select a sheet determination result reporting mode (first display mode) in which the sheet determination result based on the detection result from the media sensor 100 is reported on the display 502. FIG. 10 also illustrates a state where a setting key B 801 is displayed on the display 502. The setting key B 801 is a key to be used for the user to select a sheet determination result non-reporting mode (second display mode) in which the sheet determination result based on the detection result from the media sensor 100 is not reported on the display 502.

Processing to be executed by the control unit 400 upon receiving an image forming job instruction in a state where the sheet determination result reporting mode setting key A 800 is selected and the sheet determination result reporting mode is set will be described with reference to FIG. 11.

In step S101, upon receiving the image forming job instruction, the control unit 400 transmits an instruction to execute sheet detection to the information processing unit 160.

In step S102, the control unit 400 starts conveyance of one sheet from the manual feeding unit 235 by the conveyance unit 600.

In step S103, the control unit 400 checks whether detection data is received from the information processing unit 160. If the detection data is received (YES in step S103), the processing proceeds to step S104. If the detection data is not received (NO in step S103), the reception checking processing is continued.

In step S104, the control unit 400 stops conveyance of the sheet by the conveyance unit 600. The position of the sheet in this case corresponds to a position where a leading edge of the sheet contacts a nip portion of the registration roller pair 240. Thus, as described below, after the image forming mode is set in response to a user instruction (step S110), the image forming unit 201B can resume the image forming operation (step S112) on the sheet that has stopped in the set image forming mode. In the present exemplary embodiment, the position of the leading edge of the sheet when the sheet is stopped in step S104 corresponds to the nip portion of the registration roller pair 240. However, the position of the leading edge of the sheet is not limited to this position. For example, the stop position of the leading edge of the sheet may be located upstream of the secondary transfer roller 217 and downstream of the nip portion of the registration roller pair 240 in the sheet conveyance direction. Alternatively, for example, the stop position of the leading edge of the sheet may be located upstream of the nip portion of the registration roller pair 240 in the sheet conveyance direction. Like in the present exemplary embodiment, the configuration in which the position of the leading edge of the sheet when the sheet is stopped corresponds to the nip portion of the registration roller pair 240 has an advantageous effect that the position of the leading edge of the sheet can be accurately regulated. The control unit 400 causes the conveyance unit 600 to stop conveyance of the sheet P, and then the processing proceeds to step S105.

According to the present exemplary embodiment, in step S103, the media sensor 100 obtains detection data and the control unit 400 causes the conveyance unit 600 to stop conveyance of the sheet in step S104 after receiving the detection data. However, the present exemplary embodiment is not limited to this example. For example, the control unit 400 may cause the conveyance unit 600 to stop conveyance of the sheet in the detectable range of the media sensor 100, and the media sensor 100 may detect the physical properties of the stopped sheet. Then, the control unit 400 stops conveyance of the sheet until the conveyance of the sheet by the conveyance unit 600 is resumed in step S111 to be described below.

In step S105, the control unit 400 determines the image forming mode for the sheet conveyed in step S102.

Figure 11:
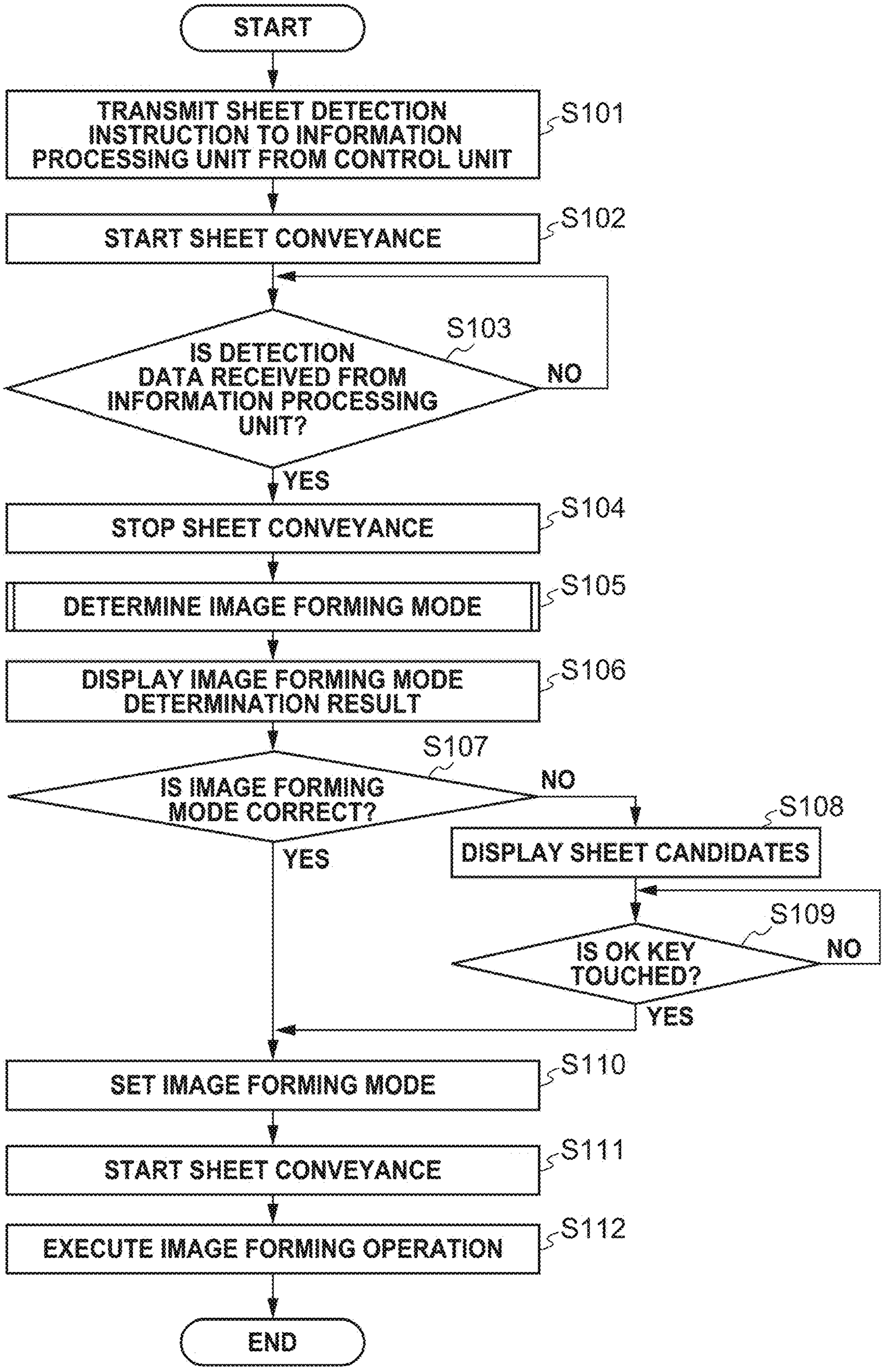
FIG. 11 is a flowchart illustrating an image forming operation.
Figure 14:
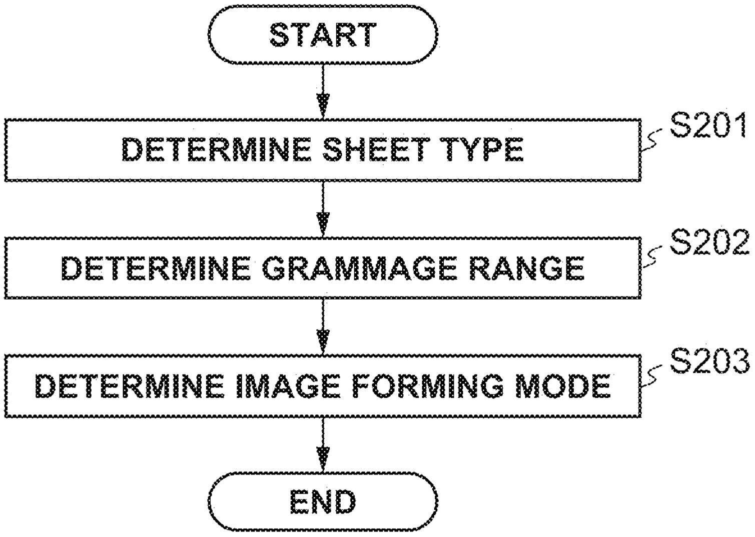
FIG. 14 is a flowchart illustrating processing for determining an image forming mode.

FIG. 14 is a flowchart illustrating processing (image forming mode determination) of step S105 illustrated in FIG. 11.

The flowchart illustrated in FIG. 14 will be described below.

When the adjacent pixel difference accumulation value, the total luminance value, and the grammage are transmitted from the information processing unit 160, the control unit 400 executes processing of step S201. In step S201, the control unit 400 determines the sheet type based on the adjacent pixel difference accumulation value and the total luminance value transmitted from the information processing unit 160 and the table corresponding to the matrix illustrated in FIG. 15.

In the matrix illustrated in FIG. 15, a vertical axis represents the adjacent pixel difference accumulation value, and a horizontal axis represents the total luminance value. The control unit 400 determines which one of "transparent film", "second original drawing", "coated paper", "plain paper", "recycled paper", and "embossed paper" corresponds to the sheet based on the adjacent pixel difference accumulation value and the total luminance value.

The information corresponding to the matrix illustrated in FIG. 15 is information preliminarily determined based on experiments and the like, and this information is stored in the memory 401. The memory 401 also stores thresholds (total luminance values "a0" to "a3" and adjacent pixel difference accumulation values "b0" to "b4") to be used for the control unit 400 to perform determination processing. After the control unit 400 executes sheet type determination processing, the processing proceeds to step S202.

In step S202, the control unit 400 determines which one of a plurality of grammage ranges illustrated in FIG. 16 corresponds to the grammage range within which the grammage transmitted from the information processing unit 160 falls. The table corresponding to the information illustrated in FIG. 16 is predetermined information. This information is stored in the memory 401. Thresholds for the grammage range are indicated by "c1" to "c23", respectively, and these values are stored in the memory 401. FIG. 16 illustrates a relationship among the grammage, the sheet type, and the image forming mode name corresponding to the image forming mode. In this case, "plain paper", "coated paper", "recycled paper", and "embossed paper" illustrated in FIG. 16 are associated with the adjacent pixel difference accumulation value and the total luminance value as illustrated in FIG. 15. In other words, in the present exemplary embodiment, the adjacent pixel difference accumulation value, the total luminance value, and the grammage are associated with the image forming mode. After the control unit 400 executes grammage range determination processing, the processing proceeds to step S203.

In step S203, the control unit 400 determines the image forming mode based on the sheet type determination result obtained in step S201, the grammage range determined in step S202, and the table corresponding to the information illustrated in FIG. 16. This image forming mode is stored in the image forming mode database 402. Examples of the image forming mode include "thin paper 1-2", "plain paper 1-3", "cardboard 1-7", "coated paper 1-3", "recycled paper 1-3", and "embossed paper 1-8" as illustrated in FIG. 16. After the control unit 400 determines the image forming mode in step S203, the processing in the flowchart of FIG. 14 ends.

After the control unit 400 determines the image forming mode, the processing proceeds to step S106.

Figure 12:
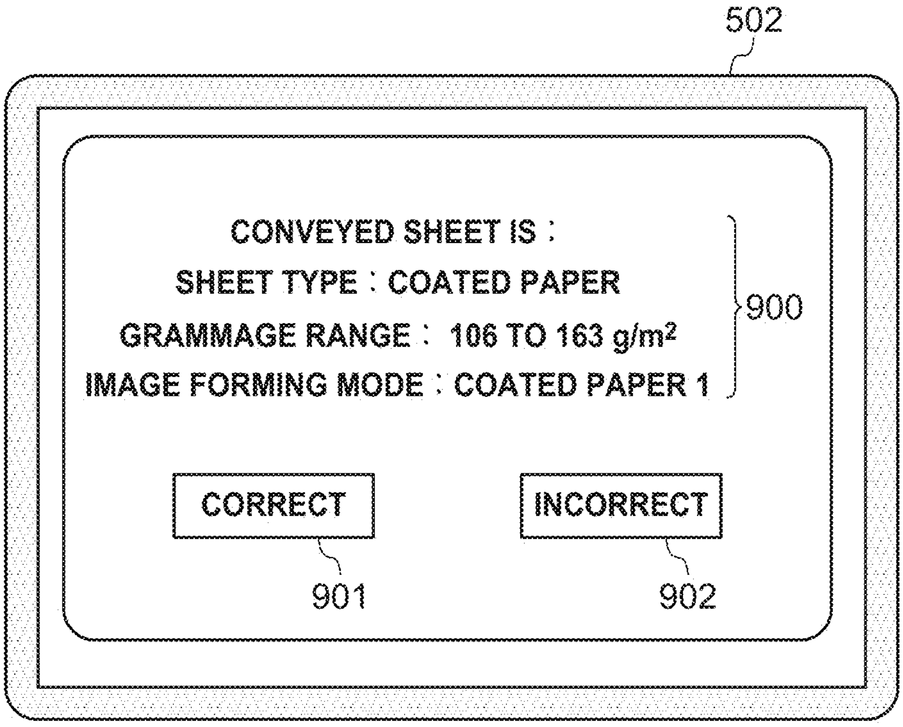
FIG. 12 illustrates a display example of the display (reporting result).

In step S106, the control unit 400 causes the display 502 to display a determination result 900 for one image forming mode. Thus, the control unit 400 reports the determination result 900 to the user. FIG. 12 illustrates an example of a screen to be displayed on the display 502 by the control unit 400 in step S106. FIG. 12 illustrates a display example of a determination result indicating that the control unit 400 determines that the sheet type is "coated paper", the grammage range is "106 to 163 g/m$^2$", and the image forming mode is "coated paper 1". This report enables the user to check whether the determination result 900 for the sheet detected by the media sensor 100 is correct or incorrect. In step S106, the determination result 900, a selection key A (operation key, first key) 901 to be used for the user to select "correct", and a selection key B (second key) 902 to be used for the user to select "incorrect" are displayed as illustrated in FIG. 12. During the image forming job, reporting as illustrated in the screen example of FIG. 12 is automatically executed, thereby enabling the user to check the detection result from the media sensor 100. The control unit 400 causes the display 502 to display the screen illustrated in FIG. 12, and then the processing proceeds to step S107.

If the control unit 400 determines that the user has performed a touch operation on the selection key A 901 for selecting "correct" in step S107 (YES in step S107), the processing proceeds to step S110. In step S110, the control unit 400 sets the image forming mode displayed on the display 502 in step S106, and then the processing proceeds to step S111. The touch operation performed on the selection key A 901 by the user in the display example illustrated in FIG. 12 indicates issuance of the image forming instruction corresponding to "coated paper" and "106 to 163 g/m$^2$" by the user. In the present exemplary embodiment, the sheet setting made by the user also indicates the touch operation on the selection key A 901 illustrated in FIG. 12 displayed on the display 502 by the user.

In the present exemplary embodiment, the selection key A 901 indicating "correct" is displayed on the display 502. However, the display of the selection key A 901 is not limited to this example. The selection key A 901 indicating "execute image formation" may be displayed. This display enables the user to easily recognize that the image forming operation is to be resumed in the image forming mode corresponding to the displayed sheet type and grammage range.

On the other hand, if the control unit 400 determines that the user has performed a touch operation on the selection key B 902 for selecting "incorrect" in step S107 (NO in step S107), the processing proceeds to step S108. In step S108, the control unit 400 causes the display 502 to display a screen illustrated in FIG. 13.

Figure 13:
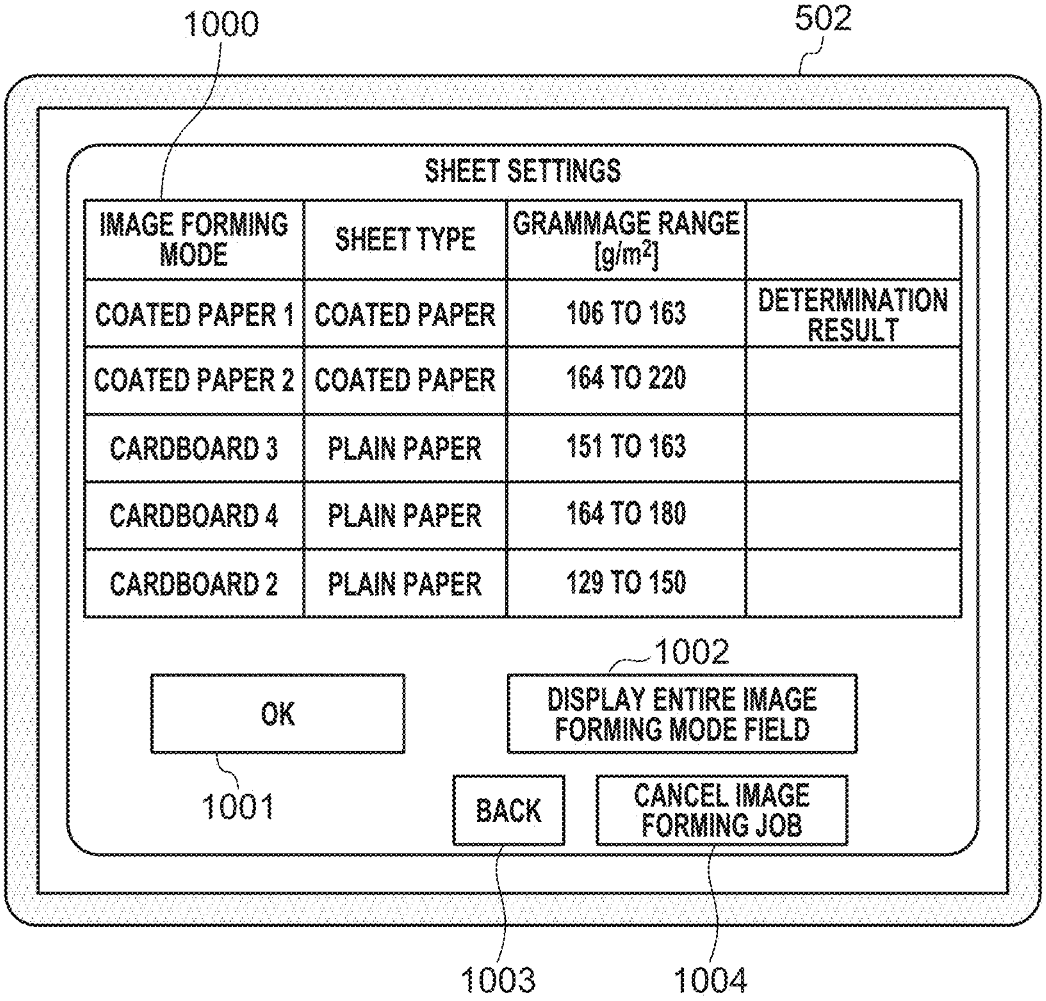
FIG. 13 illustrates a display example of the display (image forming mode setting).

FIG. 13 illustrates an example of the screen to be displayed on the display 502 by the control unit 400 in step S108. In step S108, the control unit 400 displays candidates 1000 for the image forming mode corresponding to a sheet having physical property values (grammage information, adjacent pixel difference accumulation value information, and total luminance value information) close to those of the sheet detected by the media sensor 100. A sheet having physical property values close to those of the sheet detected by the media sensor 100 indicates a sheet type close to the sheet type based on the detection result in the vertical axis direction in FIG. 15. For example, if it is determined that the sheet type based on the detection result from the media sensor 100 is coated paper, the sheet type close to coated paper in the vertical axis direction in FIG. 15 is plain paper. A sheet having physical property values close to those of the sheet detected by the media sensor 100 also indicates a sheet corresponding to a grammage range close to the grammage based on the detection result in FIG. 16. For example, if it is determined that the sheet type is coated paper and the grammage is 155 g/m$^2$ based on the detection result from the media sensor 100, the following sheets A, B, C, and D are close to this sheet in FIG. 16. The sheet A is coated paper (grammage range of 164 to 220 g/m$^2$). The sheet B is plain paper (grammage range of 151 to 163 g/m$^2$). The sheet C is plain paper (grammage range of 164 to 180 g/m$^2$). The sheet D is plain paper (grammage range of 129 to 150 g/m$^2$).

In step S108, a plurality of image forming modes is displayed as the candidates 1000, which enables the user to select one of the plurality of image forming modes from among the candidates 1000. As illustrated in FIG. 13, the determination result 900 displayed in step S106 is displayed in the top field with a comment "determination result" as one of the candidates 1000. On the screen example illustrated in FIG. 13, image forming modes other than the determination result 900 are also displayed as the candidates 1000. The display of the determination result with the comment "determination result" is advantageous in that the user can easily distinguish the sheet type and grammage range with the comment "determination result" in the candidates 1000 from the other sheet types and grammage ranges. When the user performs a touch operation on any one of the fields of the candidates 1000, the control unit 400 displays a row of items for the image forming mode corresponding to the touched field in color. For example, if coated paper 2 is touched, the control unit 400 displays a row of items for the image forming mode corresponding to coated paper 2 in blue. This display enables the user to check that the user has temporarily selected the touched image forming mode. After that, if the control unit 400 determines that an OK key 1001 is touched by the user (YES in step S109), the processing proceeds to step S110.

In step S110, the control unit 400 sets the image forming mode temporarily selected by the user in step S109 as the image forming mode for executing the image forming operation. In the present exemplary embodiment, the touch operation on one of the fields of the candidates 1000 by the user and the touch operation on the OK key 1001 by the user also indicate that sheet settings are made. If the user has not selected any one of the candidates 1000, the determination result by the control unit 400 does not indicate "YES" in step S109 even when the user touches the OK key 1001. Thus, the user can easily change sheet information displayed in step S106. Further, as described below, in step S111, the user can easily resume conveyance of the sheet, and in step S112, the user can execute image formation in the image forming mode corresponding to the changed sheet information.

If the user performs a touch operation on an "entire image forming mode field display" key 1002 on the display illustrated in FIG. 13, the control unit 400 causes the display 502 to display an entire image forming mode list. If the user selects one image forming mode from the list and performs a touch operation on the OK key 1001, in step S110, the control unit 400 sets the image forming mode selected from the list by the user as the image forming mode for executing the image forming operation. As items to be displayed on the display of the entire image forming mode list, the image forming mode, the sheet type (sheet information), and the grammage range (sheet information) are simultaneously displayed like in the display example illustrated in FIG. 13. In step S110, the control unit 400 sets the transfer voltage value of the secondary transfer unit 201D and the target temperature of the fixing unit 201E based on the settings of the image forming mode. In step S109, if the user has touched a back key 1003 illustrated in FIG. 13, the processing returns to step S106 and the control unit 400 causes the display 502 to display the screen illustrated in FIG. 12. In step S109, if the user has touched an image forming job cancel key 1004 illustrated in FIG. 13 (cancel instruction is received), the control unit 400 does not perform the image forming operation on the sheet detected by the media sensor 100. If the user has touched the image forming job cancel key 1004 illustrated in FIG. 13, the control unit 400 does not make settings for the image forming mode. Further, if the user has touched the image forming job cancel key 1004 illustrated in FIG. 13, the control unit 400 causes the conveyance unit 600 to discharge the sheet detected by the media sensor 100 onto the stacking unit 223. Then, the control unit 400 terminates the processing in this flowchart.

In step S111, the control unit 400 causes the conveyance unit 600 to start conveyance of the sheet P that has stopped in step S104. Further, the control unit 400 causes the image forming unit 201B to execute the image forming operation on the sheet in the image forming mode set in step S110. In step S112, the control unit 400 causes the conveyance unit 600 to discharge the sheet on which an image has been formed onto the stacking unit 223. In step S112, if the content of the received image forming job indicates a job for executing the image forming operation on a plurality of sheets, the control unit 400 executes the image forming operation in the image forming mode set in step S110 on the second and subsequent sheets. After the control unit 400 has completed all the image forming operation corresponding to the image forming job and the operation of discharging the sheets onto the stacking unit 223, the processing in the flowchart of FIG. 11 ends. According to the present exemplary embodiment, when the selection key A 901 is touched by the user in step S107, the conveyance of the stopped sheet is resumed and the image forming operation on this sheet is executed. Consequently, according to the present exemplary embodiment, it is possible to reliably execute the image forming operation on the sheet detected by the media sensor 100.

In step S108 according to the present exemplary embodiment, a plurality of sheet candidates as illustrated in the display example of FIG. 13 is displayed on the display 502. However, the display according to the present exemplary embodiment is not limited to this example. For example, in step S106, the control unit 400 may cause the display 502 to display the name of one image forming mode different from the image forming mode displayed in step S106 and the sheet type and grammage range corresponding to this image forming mode. The names of the other image forming modes and the sheet types and grammage ranges corresponding to these image forming modes are not displayed. This configuration enables the user to easily select an image forming mode different from the image forming mode displayed in step S106.

In step S106 according to the present exemplary embodiment, one image forming mode is displayed on the display 502. However, the present exemplary embodiment is not limited to this example. In step S106, for example, the control unit 400 may cause the display 502 to display a plurality of image forming modes with close physical property values, like in the display example of FIG. 13, based on the detection result from the media sensor 100. In this case, the control unit 400 may arrange and display the name of the image forming mode and the sheet type and grammage range corresponding to this image forming mode as illustrated in FIG. 13. The control unit 400 determines that the user has selected one of the plurality of image forming modes and has touched the OK key 1001, and then the processing proceeds to step S110. Further, in step S106, the user may select on the display 502 whether to display one image forming mode or a plurality of image forming modes, when the image forming job is not executed. If the control unit 400 causes the display 502 to display a plurality of image forming modes as illustrated in FIG. 13 in step S106, the control unit 400 further causes the display 502 to display the "entire image forming mode field display" key 1002 as illustrated in FIG. 13. When the user performs a touch operation on the "entire image forming mode field display" key 1002, the control unit 400 causes the display 502 to display the entire image forming mode list. When the user selects one image forming mode from the list and performs a touch operation on the OK button 1001, the control unit 400 may set the image forming mode selected from the list by the user as the image forming mode for executing the image forming operation. In step S106, the control unit 400 causes the display 502 to display a plurality of image forming modes with close physical property values as illustrated in the display example of FIG. 13, thereby enabling the user to select an image forming mode from among the plurality of candidates.

While FIGS. 12 and 13 illustrate display examples where the sheet type, the grammage range, and the image forming mode name are displayed, the display according to the present exemplary embodiment is not limited to these examples.

For example, the control unit 400 may cause the display 502 to display the image forming mode name as an item, and may cause the display unit 502 not to display the sheet type and the grammage range.

For example, the control unit 400 may cause the display 502 to display the image forming mode name and the grammage range as items, and may cause the display 502 not to display the sheet type.

For example, the control unit 400 may cause the display 502 to display the image forming mode name and the sheet type as items, and may cause the display 502 not to display the grammage range.

For example, the control unit 400 may cause the display 502 to display the grammage range as an item, and may cause the display 502 not to display the image forming mode name and the sheet type.

For example, the control unit 400 may cause the display 502 to display the grammage range and the sheet type as items, and may cause the display 502 not to display the image forming mode name.

For example, the control unit 400 may cause the display 502 to display the sheet type as an item, and may cause the display 502 not to display the image forming mode name and the grammage range.

Further, in the example of displaying "grammage range" among the above-described display examples, a "grammage value" (e.g., 75 [g/m$^2$]) may be displayed instead of the "grammage range" as a display content.

For example, the control unit 400 may cause the display 502 to display the image forming mode name, the sheet type, and the grammage value as items.

For example, the control unit 400 may cause the display 502 to display the image forming mode name and the grammage value as items, and may cause the display 502 not to display the sheet type.

For example, the control unit 400 may cause the display 502 to display the sheet type and the grammage value as items, and may cause the display 502 not to display the image forming mode name.

For example, the control unit 400 may cause the display 502 to display the grammage value as an item, and may cause the display 502 not to display the image forming mode name and the sheet type.

The sheet type, which is one of the items to be displayed, includes a picture corresponding to the sheet type. In other words, the control unit 400 may report pictures corresponding to "plain paper", "coated paper", "recycled paper", and "embossed paper", respectively, on the display 502.

In the present exemplary embodiment, the image forming operation is executed on the sheet detected by the media sensor 100. However, the present exemplary embodiment is not limited to this example. For example, the control unit 400 may cause the image forming unit 201B not to perform the image forming operation on the sheet detected by the media sensor 100 and the control unit 400 may cause the conveyance unit 600 to discharge the sheet onto the stacking unit 223. In this case, the control unit 400 causes the media sensor 100 to detect a first sheet, sets the image forming mode, causes the image forming unit 201B not to perform the image forming operation on the first sheet, and causes the conveyance unit 600 to discharge the first sheet onto the stacking unit 223. Then, the control unit 400 causes the image forming unit 201B to perform the image forming operation corresponding to the first sheet in the image forming job on a second sheet. However, the configuration in which the image forming operation is performed on the sheet detected by the media sensor 100 has an advantage of avoiding waste of sheets.

(Processing Performed when User Check Reporting is not Made)

Figure 17:
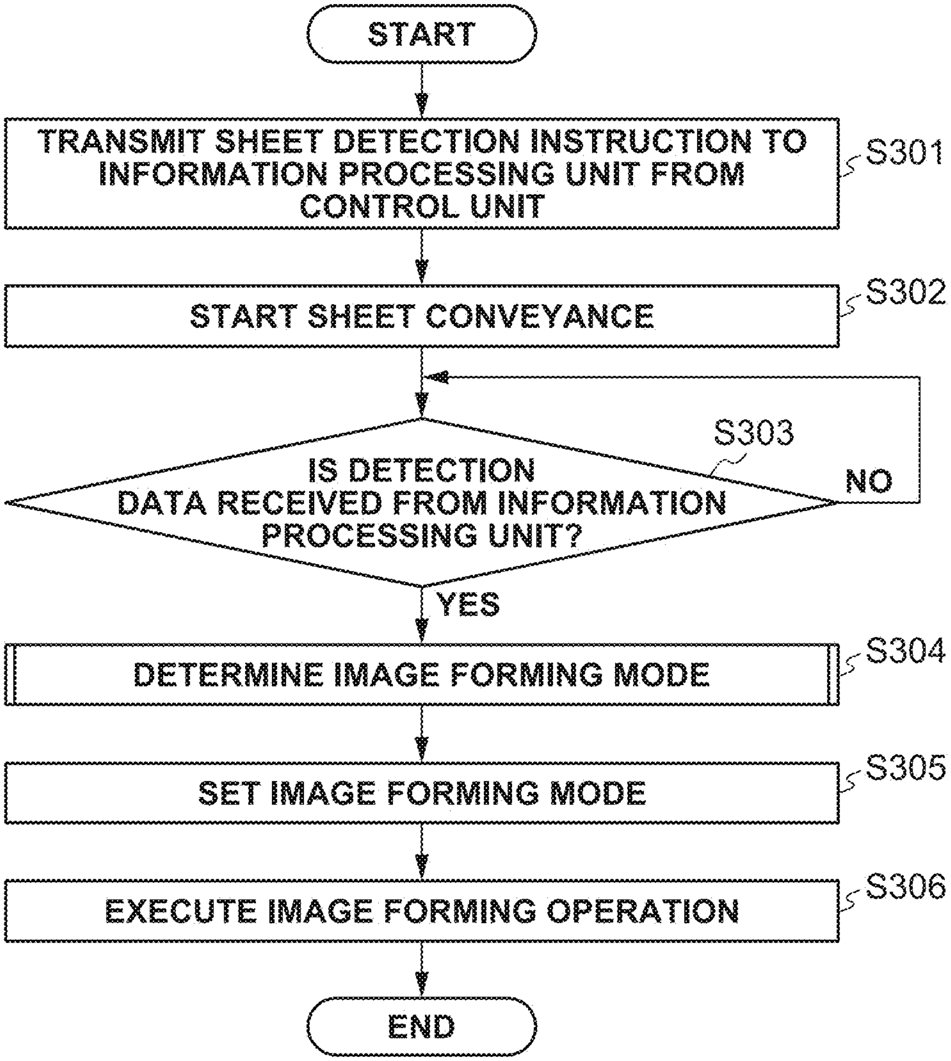
FIG. 17 is a flowchart for a sheet determination result non-reporting mode.

FIG. 17 is a flowchart illustrating processing to be executed by the control unit 400 upon receiving an image forming job instruction in a state where the sheet determination result non-reporting mode setting key B 801 is selected and the sheet determination result non-reporting mode is set in the display example illustrated in FIG. 10. The sheet determination result non-reporting mode is a mode in which the control unit 400 causes the display 502 not to display the sheet determination result based on the media sensor 100 during the image forming operation.

In step S301, upon receiving the image forming job instruction, the control unit 400 transmits an instruction to execute sheet detection to the information processing unit 160.

In step S302, the control unit 400 causes the conveyance unit 600 to start conveyance of one sheet from the manual feeding unit 235.

In step S303, the control unit 400 checks whether detection data is received from the information processing unit 160. If the detection data is received (YES in step S303), the processing proceeds to step S304. If the detection data is not received (NO in step S303), the reception check processing is continued.

In step S304, the control unit 400 determines the image forming mode for the sheet that is started to be conveyed in step S302. The control unit 400 executes the image forming mode determination processing according to the flowchart illustrated in FIG. 14. After the control unit 400 determines the image forming mode, the processing proceeds to step S305.

In step S305, the control unit 400 sets the image forming mode determined in step S304 as the image forming mode for executing the image forming operation.

In step S306, the control unit 400 causes the image forming unit 201B to form an image on the sheet in the image forming mode set in step S305, to thereby execute the image forming operation. In step S306, if the content of the received image forming job indicates a job for executing the image forming operation on a plurality of sheets, the control unit 400 executes the image forming operation on the second and subsequent sheets in the image forming mode set in step S305. After the control unit 400 has completed all the image forming operation corresponding to the image forming job and the operation of discharging the sheets onto the stacking unit 223, the processing in the flowchart of FIG. 17 ends.

The configuration for allowing the user to select the mode in which the sheet determination result is not reported is advantageous in that the user that places little importance on the quality of a product can quickly execute the image forming operation.

The media sensor 100 described above is merely an example of the exemplary embodiment, and is not intended to limit the exemplary embodiment of the present disclosure. In the present exemplary embodiment, the image forming mode database 402 includes the memory 401. However, the present exemplary embodiment is not limited to this example. For example, the media sensor 100 may include a database, and the sheet determination processing may be performed by the media sensor 100.

The exemplary embodiment described above illustrates an example where the image forming mode is determined by determining the sheet type and grammage based on physical properties of each sheet detected by the media sensor 100. However, the present exemplary embodiment is not limited to this example. For example, a sheet physical property measurement apparatus may be used as the media sensor 100, and the image forming mode may be directly determined based on the feature amount of the detected sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-105354, filed Jun. 27, 2023, which is hereby incorporated by reference herein in its entirety.

What is claimed is:

1. An image forming apparatus comprising:

a conveyance unit configured to convey a sheet;

a sheet detection unit configured to detect physical properties of the sheet conveyed by the conveyance unit;

an operation unit configured to display sheet information based on a detection result from the sheet detection unit and receive a user instruction;

a control unit configured to set an image forming condition corresponding to the sheet information;

an image forming unit configured to form an image on the sheet based on the set image forming condition, the sheet being conveyed by the conveyance unit; and a stacking unit on which the sheet discharged by the conveyance unit is stacked, wherein in a state where the operation unit displays first sheet information based on a detection result of detecting, by the sheet detection unit, physical properties of the sheet conveyed by the conveyance unit and conveyance of the sheet is stopped by the conveyance unit, in a case where the operation unit receives a user instruction indicating an instruction to form an image based on the first sheet information displayed by the operation unit, the conveyance unit resumes conveyance of the sheet, the control unit sets a first image forming condition corresponding to the displayed first sheet information, and the image forming unit forms the image on the sheet based on the first image forming condition, and in a case where the operation unit receives a user instruction to change the first sheet information displayed by the operation unit, the conveyance unit resumes conveyance of the sheet, the control unit sets a second image forming condition corresponding to second sheet information obtained after changing the first sheet information by a user, and the image forming unit forms the image on the sheet based on the second image forming condition, and wherein in a case where the operation unit receives a user instruction indicating cancellation of image formation, the conveyance unit resumes conveyance of the sheet, the image forming unit does not form the image on the sheet, and the conveyance unit discharges the sheet onto the stacking unit.

2. The image forming apparatus according to claim 1, wherein the user instruction indicating the instruction to form the image corresponding to the displayed first sheet information is an instruction indicating that the first sheet information is correct.

3. The image forming apparatus according to claim 1, wherein the first sheet information includes sheet type information.

4. The image forming apparatus according to claim 1, wherein the first sheet information includes grammage information.

5. The image forming apparatus according to claim 1, wherein the first sheet information includes sheet type information and grammage information.

6. The image forming apparatus according to claim 1, wherein in a state where the first sheet information is displayed on the operation unit, the operation unit displays the second sheet information upon receiving a user instruction.

7. The image forming apparatus according to claim 1, wherein the operation unit includes a first display mode in which the first sheet information is displayed, and a second display mode in which the detection result from the sheet detection unit is not displayed.

8. The image forming apparatus according to claim 1, wherein the sheet detection unit includes an ultrasonic sensor.

9. The image forming apparatus according to claim 1, wherein the sheet detection unit includes an optical sensor.

* * * * *